(12) United States Patent
Van Keulen et al.

(10) Patent No.: US 12,077,675 B2
(45) Date of Patent: Sep. 3, 2024

(54) PRINT METHOD

(71) Applicant: Canon Production Printing Holding B.V., Venlo (NL)

(72) Inventors: Luc Van Keulen, Venlo (NL); Pim Van Der Asdonk, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 142 days.

(21) Appl. No.: 18/075,746

(22) Filed: Dec. 6, 2022

(65) Prior Publication Data

US 2023/0193069 A1  Jun. 22, 2023

(30) Foreign Application Priority Data

Dec. 20, 2021  (EP) .................... 21216152

(51) Int. Cl.
*B41J 2/01* (2006.01)
*B41J 11/00* (2006.01)
(Continued)

(52) U.S. Cl.
CPC .............. *C09D 11/54* (2013.01); *B41J 2/01* (2013.01); *B41J 11/00214* (2021.01);
(Continued)

(58) Field of Classification Search
CPC .... B41J 2/01; B41J 11/00214; B41M 5/0017; B41M 7/0081; C09D 11/101; C09D 11/17; C09D 11/322; C09D 11/38; C09D 11/40
See application file for complete search history.

(56) References Cited

U.S. PATENT DOCUMENTS 9,777,179 B2  10/2017  Feng et al.
2009/0046134 A1*  2/2009  Belelie .............. C09D 11/101
106/31.13
(Continued)

FOREIGN PATENT DOCUMENTS

EP         3 234 037 B1   12/2020
WO    WO 2016/096603 A1    6/2016
(Continued)

OTHER PUBLICATIONS

European Search Report, issued in Application No. 21 21 6152, dated May 30, 2022.

*Primary Examiner* — Anh T Vo
(74) *Attorney, Agent, or Firm* — Birch, Stewart, Kolasch & Birch, LLP

(57) ABSTRACT

A print method includes a) applying an activator composition onto a recording medium, the activator composition comprising a photoinitiator; b) applying an inkjet ink composition onto the recording medium, the inkjet ink composition comprising a curable monomer and a gellant, the inkjet ink composition comprising no photo initiator or comprising a photo initiator in an amount of 1.0 wt % or less, based on the total amount of the ink composition; and c) curing the ink and the activator composition. Step c is started within a time period of 2 s-1000 s after applying the ink composition onto the recording medium. an ink set comprising an activator composition and an inkjet ink composition, a software product, and an inkjet printing apparatus are also disclosed.

10 Claims, 1 Drawing Sheet

(51) Int. Cl.
  *B41M 5/00*  (2006.01)
  *C09D 11/17*  (2014.01)
  *C09D 11/38*  (2014.01)
  *C09D 11/54*  (2014.01)

(52) U.S. Cl.
  CPC ........... *B41M 5/0017* (2013.01); *C09D 11/17* (2013.01); *C09D 11/38* (2013.01)

(56) References Cited

U.S. PATENT DOCUMENTS

| | | | |
|---|---|---|---|
| 2009/0135239 A1* | 5/2009 | Chretien | B41F 23/0409 347/102 |
| 2009/0258155 A1 | 10/2009 | Odell et al. | |
| 2010/0055415 A1* | 3/2010 | Belelie | C09D 11/34 427/160 |
| 2019/0389236 A1 | 12/2019 | Tiessen et al. | |
| 2020/0392358 A1 | 12/2020 | Courtet et al. | |

FOREIGN PATENT DOCUMENTS

| | | |
|---|---|---|
| WO | WO 2020/030920 A1 | 2/2020 |
| WO | WO 2021/211662 A1 | 10/2021 |

\* cited by examiner

PRINT METHOD

The present invention relates to a print method. The present invention further relates to an ink set comprising an activator composition and an ink composition. The present invention further relates to a software product. The present invention also relates to an inkjet printing apparatus.

BACKGROUND OF THE INVENTION

Methods for printing images using radiation-curable ink are well known in the art. In such methods, an image is formed by applying droplets of a radiation-curable ink onto a recording medium and curing the ink. Curing of such inks is typically done by irradiation the ink ejected onto the recording medium with a suitable type of radiation. UV radiation is most often used as radiation. Robust images may be formed using such methods.

A special class of radiation-curable ink compositions are gelling radiation-curable ink compositions. These ink compositions also referred to as phase change radiation-curable ink compositions. These ink composition comprise a gellant that provides the ink composition with gelling properties; the ink composition is fluid at elevated properties and gelled at lower temperatures. Gelling radiation-curable ink compositions are known e.g. from EP 3234037.

Radiation-curable ink compositions, including gelling radiation-curable ink compositions need to be cured after printing to obtain a robust image. By curing the ink, curable components present in the ink composition react and undergo a polymerization reaction.

To start such polymerization reaction, a photoinitiator is needed. In conventional radiation-curable ink compositions, the photoinitiator is present in the ink composition. However, photo-initiators are typically components that are unwanted from a health and safety perspective. Furthermore, photo-initiators are typically expensive. Therefore, it is desired to keep the amount of photoinitiator in an ink composition as small as possible, while still be able to effectively cure the ink composition.

It is therefore an object of the invention to mitigate the above problem. It is a further object of the invention to provide a method and an ink set that allow to use small amounts of photoinitiator, while still achieving good curing properties.

The object of the invention is achieved in a print method comprising the steps of:
a) applying an activator composition onto a recording medium, the activator composition comprising a photoinitiator;
b) applying an inkjet ink composition onto the recording medium, the inkjet ink composition comprising a curable monomer and a gellant, the ink composition comprising no photo initiator or comprising a photo initiator in an amount of 1.0 wt % or less, based on the total amount of the ink composition;
c) curing the inkjet ink composition and the activator composition, wherein step c is started within a time period of 2 s-1000 s after applying the inkjet ink composition onto the recording medium.

The present invention relates to a print method. In a print method, a marking material such as an ink composition is applied onto a recording medium to provide the recording medium with an image. The recording medium may be any type of material suitable to be provided with an image using ink. The recording medium may be e.g. plain paper, machine coated paper, vinyl media including self-adhesive vinyls, polyester textiles, canvas or rigids.

In the method according to the present invention, in step a, an activator composition is applied onto a recording medium, the activator composition comprising a photoinitiator. The activator composition is a composition that, when brought into contact with the inkjet ink composition, can activate one or more components in the inkjet ink composition. The activator composition may also be referred to as primer composition, pre-treatment liquid or after-treatment liquid. The activator composition according to the present invention comprises at least a photo initiator. A photo initiator is a compound that creates reactive species when exposed to radiation. Examples of a reactive species are free radicals, cations or anions. The activator composition may comprise a type I photoinitiator, a type II photoinitiator, a co-initiator or a combination thereof.

The activator composition may further comprise additional components, such as, but not limited to, one or more solvents, water, one or more curable monomers, one or more curable oligomers, a resin or an inhibitor. Preferably, the activator composition is free of colorant.

The activator composition may be applied to the recording medium using one or more suitable applicators. Such applicators may include, but are not limited to, one or more rollers, one or more spray units or one or more ink jet print heads, or a combination thereof.

In the method according to the present invention, in step b, an inkjet ink composition is applied onto the recording medium, the inkjet ink composition comprising no photo initiator or comprising a photo initiator in an amount of 1.0 wt % or less, based on the total amount of the ink composition.

The inkjet ink composition according to the present invention may comprise a radiation-curable medium. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth)acrylates. (Meth-)acrylates may comprise one or more reactive groups for forming an acrylate polymer. The radiation-curable medium may comprise one type of radiation curable compound or alternatively, the radiation-curable medium may comprise a mixture of radiation-curable compounds.

The inkjet ink composition may also be referred to as ink, ink composition, UV-curable (inkjet) ink, UV-curable (inkjet) ink composition, radiation-curable (inkjet) ink or radiation-curable (inkjet) ink composition.

The radiation-curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise one or more surfactants, inhibitors, antibacterial components and anti-fungi components.

The radiation curable inkjet ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

The inkjet ink composition according to the present invention comprising no photo initiator or comprising a photo initiator in an amount of 1.0 wt % or less, based on the total amount of the ink composition. The photo initiator may be absent in the inkjet ink composition. Alternatively, the amount of photo initiator in the inkjet ink composition may be low, i.e. 1.0 wt % or less, based on the total amount of the ink composition. For example, the amount of photo initiator in the ink composition may be low, i.e. 0.5 wt % or less, based on the total amount of the ink composition. In case the inkjet ink composition comprises a photo initiator, the photo initiator may be the same or different as the photoinitiator in the primer composition.

The activator composition may be applied onto the recording medium before the inkjet ink composition is applied. Alternatively, the activator composition and the inkjet ink composition may be applied simultaneously onto the recording medium. In a further alternative, the activator composition is applied onto the recording medium after the inkjet ink composition has been applied onto the recording medium. In an embodiment, the activator composition may be applied before and after the inkjet ink composition has been applied onto the recording medium.

Preferably, the activator composition is applied before the ink composition is applied or the activator composition and the ink composition are applied simultaneously.

In the method according to the present invention, in step c, curing the inkjet ink and the primer composition, wherein step c is started within a time period of 2 s-1000 s after applying the inkjet ink composition onto the recording medium.

Preferably, the activator composition is not cured before the inkjet ink composition is applied onto the recording medium. If the activator composition is applied onto the recording medium before the inkjet ink composition, then the inkjet ink composition may thus be applied onto the non-cured activator composition. Alternatively the activator composition and the inkjet ink composition are applied simultaneously, and may both be in a non-cured state when they are applied. The activator composition and the inkjet ink composition may both be in a non-cured state until the ink and activator are cured in step c. There is a time interval between applying the ink onto the recording medium and curing the ink. This time interval may last between 2 s and 1000 s. Because the inkjet ink composition is a gelling ink composition, the viscosity of the ink may increase after the ink has been applied onto the recording medium. Because of the gelling, spreading of the droplets is controlled. Thus, the droplets may not spread excessively, and thus color bleeding may be prevented. A image having good image quality may thus be obtained even though the ink composition is not cured directly after being applied onto the recording medium. Without wanting to be bound to any theory, it is believed that the photo initiator of the activator composition may diffuse into the inkjet ink composition. During the time interval between applying the inkjet ink composition and curing, the photo initiator may hence diffuse into the inkjet ink composition. The concentration of the initiator in the inkjet ink may thus increase in time after the inkjet ink has been applied onto the recording medium onto which also the activator composition was applied. Because of the increase in concentration of photo initiator in the inkjet ink composition, the inkjet ink composition may be cured effectively after lapse of the time interval, thereby obtaining a robust image. Preferably, the time interval between applying the inkjet ink composition and curing the inkjet ink composition and the activator composition is in the range of 3 s-800 s, more preferably in the range of 5 s-500 s.

Curing may be done by irradiating the inkjet ink composition and the activator with a suitable type of radiation. Preferably, the inkjet ink composition and the activator composition are irradiated with UV-radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

The time interval may be suitable controlled by selecting and/or controlling one of the following parameters: the position of the ink applicator, the position of the source of radiation, the distance of the recording medium with respect to the ink applicator, the distance of the recording medium with respect to the source of radiation and the speed of relative movement of the recording medium and the source of radiation.

In an embodiment, the activator composition and the inkjet ink composition are cured at least 2 seconds after the latest one of the activator composition and the inkjet ink composition has been applied onto the recording medium. More preferably, the activator composition and the inkjet ink composition are cured at least 5 seconds after the latest one of the activator composition and the inkjet ink composition has been applied onto the recording medium. For example, the activator composition and the inkjet ink composition are cured at least 10 seconds after the latest one of the activator composition and the inkjet ink composition has been applied onto the recording medium.

In an embodiment, the gellant is present in an amount of 0.05 wt %-4.0 wt % based on the total weight of the radiation-curable inkjet ink composition. For example, the gellant may be present in an amount of 0.1 wt %-3.0 wt % based on the total weight of the radiation-curable inkjet ink composition, such as from 0.2 wt %-2.0 wt % based on the total weight of the radiation-curable inkjet ink composition.

In case the gellant is present in an amount of less than 0.10 wt %, based on the total weight of the radiation-curable inkjet ink composition, then insufficient gelling of the ink may take place upon applying the ink onto a recording medium. Insufficient gelling may result in print artefacts, such as color bleeding. In case the gellant is present in an amount of more than 4.0 wt %, then the viscosity of the ink may increase thereby decreasing the jettability of the ink.

In an embodiment, in step a, the activator is applied imagewise and no activator is applied on positions where no inkjet ink composition is applied in step b.

By applying the activator imagewise, the activator can selectively be applied on the recording medium and selected areas of the recording medium may not be covered with the activator composition. Preferably, the areas onto which activator is applied matches the areas onto which the inkjet ink composition is applied in the printing process. The advantage thereof is that the activator comprising the photo initiator is only applied onto areas of the recording medium on which inkjet ink composition will be applied in a later stage and no activator comprising the photo initiator is applied onto areas of the recording medium on which no inkjet ink composition will be applied in a later stage. This reduces the consumption of activator and hence also the consumption of photo initiator.

The activator may be applied using a suitable applicator, such as an ink jet print head.

In an embodiment, the activator composition is applied using a print head. The print head may preferably be an ink jet print head. The print head for applying the activator composition may be a page-wide print head. Alternatively, the print head may have a width smaller than the dimension of the recording medium and may be moved with respect to the recording medium in a scanning direction.

In a further embodiment, the print head configured to eject the activator composition is positioned upstream, in the direction of medium transport, with respect to a print head configured to apply inkjet ink composition onto the recording medium.

By using this configuration of print heads, the recording medium may be suitably provided with activator and ink. When the recording medium moves with respect to the print heads in the direction of medium transport, the activator composition is applied onto the recording medium first and the ink composition is applied onto the recording medium afterwards.

The print head for applying the activator composition may be a page-wide print head. Alternatively, the print head may have a width smaller than the dimension of the recording medium and may be moved with respect to the recording medium in a scanning direction.

In an embodiment, the temperature of the recording medium is controlled during printing. Temperature control of the medium may increase the control over the gelling of the ink after application.

The temperature of the receiving medium may be controlled by suitable temperature regulation means. The temperature regulation means may be configured to cool the receiving medium and/or heat the receiving medium. Any suitable type of temperature regulation means may be used. For example, an electrical heating or cooling may be used. Optionally, a cooling fluid, such as water, may be used.

In an embodiment, the inkjet ink composition and the activator are cured by applying electromagnetic radiation to the ink and activator. The ink may be irradiated with suitable radiation, for example UV radiation. The radiation, such as the UV radiation may be provided by a suitable radiation source, such as a lamp, e.g. a UV lamp. Optionally, a plurality of sources may be used to irradiate the inkjet ink composition and activator composition.

In an aspect of the invention, an ink set is provided, the ink set comprising an activator composition and an inkjet ink composition, the activator composition comprising a photoinitiator and the inkjet ink composition comprising a curable monomer and a gellant, the inkjet ink composition comprising no photo initiator or comprising a photo initiator in an amount of 1.0 wt % or less, based on the total amount of the ink composition.

The ink set may comprise a activator composition as described above and an inkjet ink composition as described above. The ink set may be used when performing the method according to the present invention.

In an embodiment, the activator composition further comprises a gellant.

The activator composition may comprise a gellant. This may provide the activator composition with gelling properties. The gellant of the activator composition may be the same as the gellant in the inkjet ink composition or may be different from the gellant in the inkjet ink composition. When the activator composition comprises a gellant, the activator image applied onto the recording medium may not spread excessively. Components suitable as gellant are known in the art.

In an embodiment, the inkjet ink composition further comprises a colorant. The colorant may be a pigment, a dye or a mixture thereof. Further, the inkjet ink composition may comprise a mixture of dyes and/or a mixture of pigments. The colorant may provide the ink composition with a predetermined color.

In an aspect of the invention, a software product is provided, the software product comprising program code on a non-transitory machine-readable medium, wherein the program code, when loaded into a controller of a printer with ink jet print heads, causes the controller to perform a method according to the present invention.

In an aspect of the invention, an ink-jet printing apparatus is provided, the ink-jet printing apparatus comprising:
 a) a first jetting device configured to in operation eject an activator composition, the activator composition comprising a photoinitiator;
 b) a second jetting device configured to in operation eject an inkjet ink composition, the inkjet ink composition comprising a curable monomer and a gellant, the inkjet ink composition comprising no photo initiator or comprising a photo initiator in an amount of 1.0 wt % or less, based on the total amount of the ink composition;
 c) a curing unit; and
 d) a controller configured to control the ink-jet printer to perform a method according to the present invention.

The ink-jet printing apparatus is thus configured to perform the method according to the present invention.

Preferably, the first jetting device and the second jetting device are ink jet print heads.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
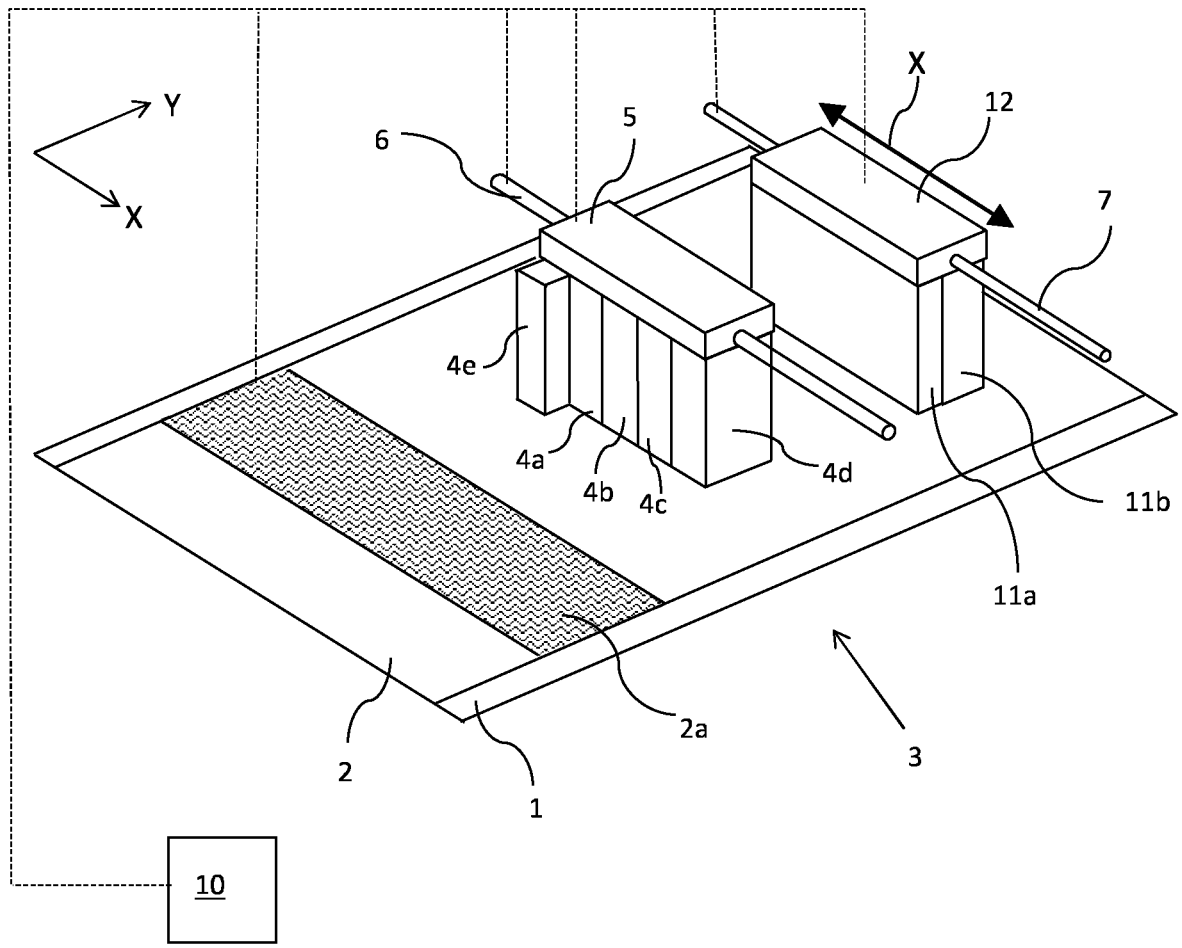
FIG. 1A shows a schematic representation of an inkjet printing system.
Figure 1B:
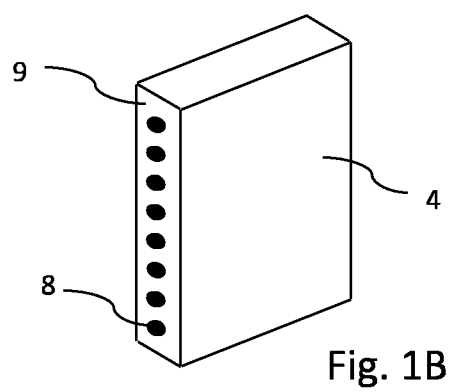
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4e, mounted on a scanning print carriage 5. The scanning print carriage 5 is guided by suitable guiding means 6 to move in reciprocation in the main scanning direction X. Each print head 4a-4e comprises an orifice surface 9, which orifice surface 9 is provided with at least one orifice 8, as is shown in FIG. 1B. The print heads 4a-4e are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4e provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the five print heads 4a-4e and may be moved in reciprocation in the main scanning direction X parallel to the platen 1, such as to enable scanning of the image receiving medium 2 in the main scanning direction X. Only five print heads 4a-4e are depicted for demonstrating the invention. In practice an arbitrary number of print heads may be employed. In any case, at least one print head 4a-4e per color of marking material is placed on the scanning print carriage 5. For example, for a black-and-white printer, at least one print head 4a-4e, usually containing black marking material is present. Alternatively, a black-and-white printer may comprise a white marking material, which is to be applied on a black image-receiving medium 2. For a full-color printer, containing multiple colors, at least one print head 4a-4e for each of the colors, usually black, cyan, magenta and yellow is present. An additional print head may be provided for applying a activator composition onto the recording medium. Often, in a full-color printer, black marking material is used more frequently in comparison to differently colored marking material. Therefore, more print heads 4a-4e containing black marking material may be provided on the scanning print carriage 5 compared to print heads 4a-4e containing marking material in any of the other colors. Alternatively, the print head 4a-4e containing black marking material may be larger than any of the print heads 4a-4e, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4e comprises an orifice surface 9 having at least one orifice 8, in fluid communication with a pressure chamber containing fluid marking material provided in the print head 4a-4e. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4e are depicted in FIG. 1B, however obviously in a practical embodiment several hundreds of orifices 8 may be provided per print head 4a-4e, optionally arranged in multiple arrays.

As depicted in FIG. 1A, four print heads 4a-4d are placed parallel to each other. The four print heads 4a-4d are print heads configured to eject a colored ink during printing operation, for example, a cyan ink, a magenta ink, a yellow ink and a black ink. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8. Further, a fifth print head 4e is provided. The fifth print head is configured to eject a activator composition onto the recording medium. This fifth print head 4e is positioned upstream in the sub scanning direction Y with regard to the other print heads 4a-4d. Hence, the activator can be applied onto the recording medium before the ink composition is applied onto the recording medium.

In an alternative embodiment (not shown), the five print heads 4a-4e may be placed in parallel. In this embodiment, the activator composition and the ink composition may be applied onto the image receiving material 2.

The ink jet printing assembly 3 may further comprise curing means 11a, 11b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11b may differ or may be the same. The first and second curing means are depicted as distinct devices. However, alternatively, only one source of UV radiation emitting a spectrum of radiation may be used, together with at least two distinct filters.

Each filter may absorb a part of the spectrum, thereby providing two beams of radiation, each one having intensity different from the other.

The flat surface 1, the temperature control means, the carriage 5, the print heads 4a-4d, the carriage 12 and the first and second curing means 11a, 11b are controlled by suitable controlling means 10.

Experiments and Examples

Materials

SR 306 (a difunctional tripropylene glycol diacrylate), SR 307 (a difunctional polybutadiene diacrylate), SR355 (a tetrafunctional acrylate) and SR 351 (a trifunctional acrylate) were obtained from Sartomer. Pentaerythritoltetrastearate was obtained from NOF as WE-6. Irgacure 819 was obtained from BASF. UVgel 460 inks—commercially available for use with the Colorado 1650 printer—were obtained from Canon. All chemicals were used as received.

Methods

Printing

Prints were made using a Canon Colorado 1650 printer. As ink supply, one of the ink channels of the printer was provided with ink composition Ex1 and another one of the ink channels of the printer was provided with activator composition Ex2. The Colorado 1650 printer was operated in the glossy mode, unless stated otherwise.

Ink Composition & Activator Composition

A radiation-curable ink composition was prepared by providing 40.0 g of SR 306, 30 g of SR 307 and 30 g of SR 351 as radiation-curable monomers, 5.0 gr of pentaerythritoltetrastearate and 7 gr of a pigment dispersion, said pigment dispersion comprising 25 wt % of carbon black dispersed in SR351 and mixing the components. This resulted in ink composition Ex1.

A radiation-curable activator composition was prepared by providing 40.0 g of SR 306, 30 g of SR 307 and 30 g of SR 351 as radiation-curable monomers, 2.5 g Irgacure 819 as a photo-initiator, 5.0 gr of pentaerythritoltetrastearate and mixing the components. This resulted in activator composition Ex2.

Comparison Experiments

Examples and Comparative Examples

Curing Experiment 1

A print was prepared, wherein a black square of 8 cm*1 cm was printed onto the recording medium using ink composition Ex1 and activator composition Ex2. The printed image was cured after the ink and activator compositions were applied onto the recording medium. The time interval between applying the ink composition and curing was 10 s.

After printing and curing, the recording medium provided with the ink was washed with methyl ethyl ketone. Methyl ethyl ketone is a solvent that dissolved uncured ink, but does not dissolve cured ink. By washing the medium with methyl ethyl ketone, no ink was removed. This means the ink was cured and a robust image was formed on the recording medium.

Comparative Curing Experiment 1

A print was prepared, wherein a black square of 8 cm*1 cm was printed onto the recording medium using only ink composition Ex1. The printed image was cured after the ink composition was applied onto the recording medium. The time interval between applying the ink composition and curing was 10 s.

After curing, the recording medium provided with the ink was washed with methyl ethyl ketone. By washing the medium with methyl ethyl ketone, the ink was removed. This means the ink was not cured and did not form a robust image on the recording medium.

By comparing Curing Experiment 1, which is a curing method according to the present invention with Comparative Curing Experiment 1, which is a method not according to the present invention, it is included that the method according to the present invention resulted in a cured image, whereas the method not according to the present invention did not.

Curing Experiment 2

Two prints were prepared, wherein a black square of 8 cm*1 cm was printed onto the recording medium using ink composition Ex1 and activator composition Ex2. The printed images were cured after the ink and activator compositions were applied onto the recording medium.

In Curing Experiment 2, the printer was operated in the glossy mode and the time interval between applying the ink composition and curing was 10 s.

In Comparative Curing Experiments 2, the printer was operated in the matt mode and the time interval between applying the ink composition and curing was 0.2 s.

TABLE 1 comparison curing experiments

| Curing Experiments | Time interval | Amount of free acrylate |
|---|---|---|
| Curing Experiment 2 | 10 s | 8 mmol/m$^2$ |
| Comparative Curing Experiment 2 | 0.2 s | 13 mmol/m$^2$ |

After curing, the amount of free acrylate in the ink and activator applied onto the recording medium was determined using NMR analysis. The amount of free acrylate is a measure for the curing rate. The less free acrylate is present, the better the curing. In Curing Experiment 2, which is an example according to the present invention, some free acrylate was present, but the amount was less compared to Comparative Curing Experiment 2, which is an example not according to the present invention. Hence, curing rate was improved by choosing a time interval between applying the ink and curing in the range of 2 s-1000 s.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A print method comprising the steps of:
   a) applying an activator composition onto a recording medium, the activator composition comprising a photoinitiator;
   b) applying an inkjet ink composition onto the recording medium, the inkjet ink composition comprising a curable monomer and a gellant, the inkjet ink composition comprising no photo initiator or comprising a photo initiator in an amount of 1.0 wt % or less, based on the total amount of the ink composition; and
   c) curing the ink and the activator composition,
   wherein step c is started within a time period of 2 s- 1000 s after applying the ink composition onto the recording medium.

2. The print method according to claim 1, wherein in step a, the activator composition is applied imagewise and no activator composition is applied on positions where no ink is applied in step b.

3. The print method according to claim 1, wherein the activator composition is applied using a print head, said print head being positioned upstream, in the direction of medium transport, with respect to a print head configured to apply ink onto the recording medium.

4. The print method according to claim 1, wherein the temperature of the recording medium is controlled during printing.

5. The print method according to claim 1, wherein the ink and the activator composition are cured by applying electromagnetic radiation to the ink and activator composition.

6. A software product comprising program code on a non-transitory machine-readable medium, wherein the program code, when loaded into a controller of a printer with ink jet print heads, causes the controller to perform the method according to claim 1.

7. An ink-jet printing apparatus, the ink-jet printing apparatus comprising:
   a) a first jetting device configured to, in operation, eject an activator composition, the activator composition comprising a photoinitiator;
   b) a second jetting device configured to, in operation, eject an inkjet ink composition, the inkjet ink composition comprising a curable monomer and a gellant, the inkjet ink composition comprising no photo initiator or comprising a photo initiator in an amount of 1.0 wt % or less, based on the total amount of the ink composition;
   c) a curing unit; and
   d) a controller configured to control the ink-jet printer to perform the method according to claim 1.

8. An ink set comprising an activator composition and an inkjet ink composition, the activator composition comprising a photoinitiator and the inkjet ink composition comprising a curable monomer and a gellant, the inkjet ink composition comprising no photo initiator or comprising a photo initiator in an amount of 1.0 wt % or less, based on the total amount of the ink composition.

9. The ink set according to claim 8, wherein the activator composition further comprises a gellant.

10. The ink set according to claim 8, wherein the inkjet ink composition further comprises a colorant.

* * * * *